United States Patent [19]
Borcherding

[11] Patent Number: 4,883,408
[45] Date of Patent: Nov. 28, 1989

[54] MOTOR FAN RETENTION ON A NON-STEPPED SHAFT

[75] Inventor: Gary W. Borcherding, St. Louis County, Mo.

[73] Assignee: Emerson Electric Co., St. Louis, Mo.

[21] Appl. No.: 255,838

[22] Filed: Oct. 7, 1988

[51] Int. Cl.$^4$ ............................................. B63H 1/20
[52] U.S. Cl. .......................... 416/93 R; 416/241 A; 416/244 R; 310/62; 310/63
[58] Field of Search ................. 310/62, 63, 42, 89, 310/43, 261; 403/290, 373; 416/93 R, 241 A, 244 R

[56] References Cited

U.S. PATENT DOCUMENTS

| | | | |
|---|---|---|---|
| 3,872,691 | 3/1975 | Hildebrandt | 416/241 A |
| 4,689,507 | 8/1987 | Baker | 310/63 |

FOREIGN PATENT DOCUMENTS

| | | | |
|---|---|---|---|
| 0613721 | 1/1961 | Canada | 310/62 |
| 1164032 | 3/1984 | Canada | 310/63 |
| 2118456 | 12/1971 | Fed. Rep. of Germany | 416/241 A |
| 0197136 | 10/1985 | Japan | 310/62 |

*Primary Examiner*—R. Skudy
*Attorney, Agent, or Firm*—Polster, Polster and Lucchesi

[57] ABSTRACT

A dynamoelectric machine has a housing and a rotor assembly including a rotatable non-stepped shaft which projects through an opening in an end wall of the housing. A fan moves air through the machine to ventilate it and keep it cool. The fan is secured to an end of the shaft extending through the opening by a tab fitting in a groove formed in the shaft and a retention ring fitting over a hub portion of the fan in which the tab is formed.

7 Claims, 1 Drawing Sheet

MOTOR FAN RETENTION ON A NON-STEPPED SHAFT

BACKGROUND OF THE INVENTION

This invention relates to dynamoelectric machines and more particularly, to an induction motor having a rotor shaft and a fan which is installable on the shaft in a more cost efficient way. While the invention is disclosed in particular detail with respect to such application, those skilled in the art will recognize the wider applicability of the invention disclosed hereinafter.

In order to operate properly and have a long service life, it is important for dynamoelectric machines such as electric motors to operate within a certain temperature range. That is to say, physical properties of wire insulation, bearing lubricant material, and overall electrical performance of the motor all are adversely effected by high temperature operations. The problem can become particularly troublesome when the motor operates in enclosed environments, such as domestic appliances, in the form of dishwashers, for example. In the past, the methods employed to solve the problem involved relatively high cost construction techniques for the motor design. One way to reduce temperature is to attach a fan on a motor shaft with the fan moving sufficient air through the motor to keep it cool. Usually, prior art designs employed a shaft having a flat or keyway formed in it. The fan is designed for attachment to the flat or keyway portion of the shaft. However, there is a cost associated with manufacturing and assembling a stepped shaft having flats or keyways for a motor and the fan used with such a shaft. It would be advantageous if a non-stepped, lower cost shaft could be used in the motor. However, prior art motor fans, are not designed for installation on such shafts.

SUMMARY OF THE INVENTION

Among the several objects of the present invention may be noted the improvement of a generally uniform diameter shaft for installation in a motor assembly, and a ventilating fan mountable on the shaft in a way that requires less working of the motor shaft;

the provision of such improvement in which the fan is readily installable with the rotor during motor assembly;

the provision of such improvement in which the fan is retained on the shaft even when the shaft is rotating at speed; and, the provision of such improvement which lowers motor cost, improves a readily automated method of locating and maintaining a fan on a motor, and permits the use of smaller diameter shafts thereby reducing material cost for a motor.

In accordance with this invention, generally stated, a dynamoelectric machine comprises a housing, a stator assembly, and a rotor assembly including a rotatable generally single diameter shaft. The shaft projects through an opening in an end wall or endshields of the motor. An improvement comprises a fan for moving air through the machine to ventilate it and keep it cool. Simplified, low cost means are provided for securing the fan to the end of the non-stepped shaft extending through the opening and for maintaining it there when the motor is operating at its normal speed. Other objects and features will be in part apparent and in part pointed out hereinafter.

DESCRIPTION OF A PREFERRED EMBODIMENT

Figure 1:
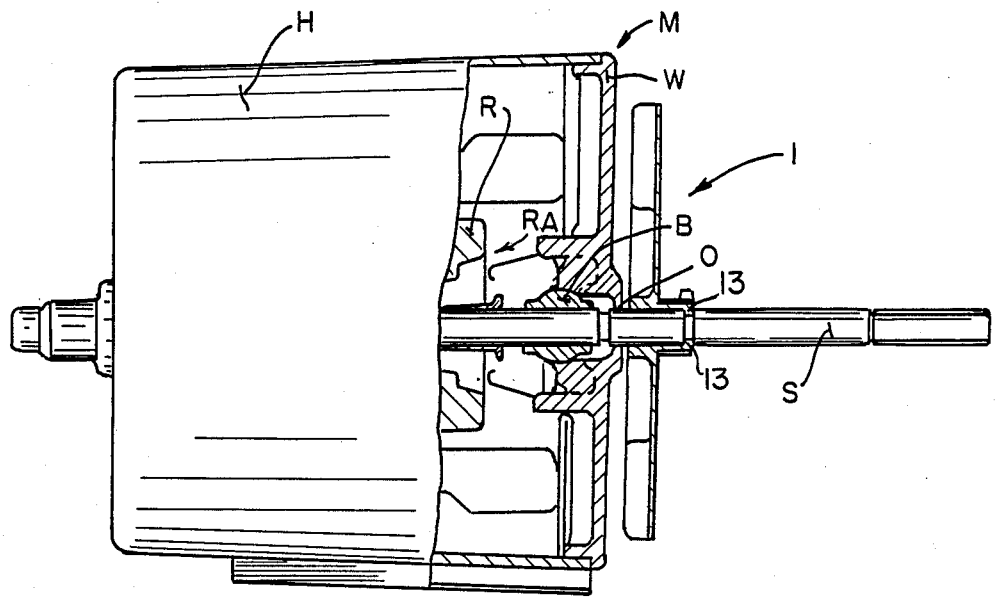
FIG. 1 is a view in side elevation, partly broken away, of one illustrative embodiment of electric motor employing fan retention system of the present invention.

Referring now to the drawings, FIG. 1 illustrates a dynamoelectric machine or electric motor M including a housing H. A stator assembly, not shown, includes a stator core having a bore opening in it, sized to receive a rotor R of a rotor assembly RA. Rotor assembly RA includes a rotatable non-stepped or uniform diameter shaft S. As shown in the drawing, the shaft is journaled in a bearing B and the shaft projects through an opening O in an end wall or endshield W of the housing. The motor M is of a unique, low cost construction, and various constructional features forming a part of the present invention are described in copending U.S. Pat. application Ser. Nos. 255,756, by Baker, 255,755, by Borcherding, 255,757, by Borcherding et al, 255,706, by Borcherding et al, 255,707, by Ottersbach, 255,727, by Hildebrandt et al, and 255,758, by Borcherding et al, which are assigned to the assignee of the present application, the disclosures of which are intended to be incorporated herein by reference. Those skilled in the art will recognize that the end wall W may be an independent endshield positioned to support the shaft S at each end of the motor M, with or without use of any associated housing or shell H.

An improvement of the present invention includes means for mounting a fan 1 for moving air through the motor M to ventilate the motor and keep it cool. Fan 1 includes two or more fan blades 3 which move the air. In the embodiment illustrated, the fan has a central hollow, cylindrical shaped hub 5 and the fan blades, which are integrally formed with the hub, extend radially outwardly from the outer surface of the hub. The hub has an inner diameter corresponding to the diameter of shaft S of the rotor assembly RA, enabling fan 1 to be slidingly inserted over the shaft during motor assembly, to mount the fan 1 on the shaft. The hub has an inner section 7 which is adjacent to but clear the end wall W when the fan is installed, and an outer section 9.

Figure 2:
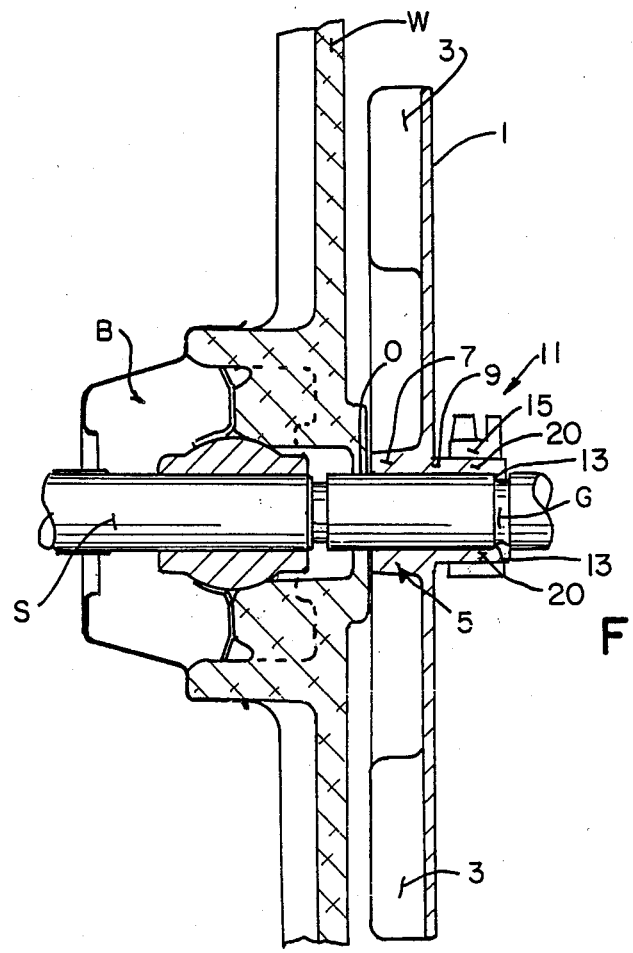
FIG. 2 is an enlarged sectional view of a portion of the electric motor shown in FIG. 1 with the fan mounting system of the present invention shown for securing the fan to a motor shaft.

Shaft S has a circumferential groove G positioned in a predetermined position with respect to the wall W. Means 11, for locating and securing the fan to the shaft, includes a plurality of tabs 13 formed at the outer section 9. Two tabs 13 are shown in FIG. 2. At least one of the tabs 13 has a projection 20 extending inwardly of the tabs to delimit an effective diameter smaller than the diameter of the shaft S. The projection 20 is sized to mate with and fit in the groove G. The tabs 13 are integrally formed, extend circumferentially around, and in the illustrated embodiment define the outer section 9. The projections 20 of the tabs 13 snap fit into groove G when the fan is slidingly inserted over the shaft, during motor construction, to locate the fan 1 with respect to the motor M.

Besides the projection 20 of the tabs 13, means 11 further includes a retention ring 15. Ring 15 is a flexible ring constructed from plastic, metal, or other flexible material. The ring 15 is sized to fit over the outer cylindrical surface of the hub 5. The ring 15 is designed to exert a sufficient compressive force on the tabs 13 to prevent the tabs from pulling out of groove G when the shaft is spinning or rotating at normal motor speed. Ring 15 preferably is installed over hub 5 after the fan has been installed over the shaft and tab 13 projections 20 fitted into groove G.

As thus described, a low cost system for mounting a fan to a shaft of a dynamoelectric machine meeting all the ends and objects set forth is provided.

Numerous variations, within the scope of the appended claims, will be apparent to those skilled in the art in light of the foregoing description and accompanying drawings. The motor housing H and fan 1 are intended to be constructed from molded plastic. Thus, the ring 15 may be constructed from any material compatible with those employed for the motor M. Other materials may be employed, if desired. The motor M, and in particular the housing H, is shown as having a particular design shape. Other design shapes may be employed, if desired. Likewise, the blade dimension or number may vary in other embodiments of this invention. As illustrated, the housing may be eliminated and separately endshields can be used to support the shaft for rotation. While the fan 1 was described as being mounted externally of the motor wall W, the fan may be positioned internally of the wall in other embodiments of this invention. These variations are merely illustrative.

Having thus described the invention, what is claimed and desired to be secured by Letters Patent is:

1. In a dynamoelectric machine comprising a housing, and a rotor assembly including for at least a portion its axial length a rotatable generally uniform diameter shaft, an outer end of the shaft projecting through an opening in an end wall of the housing, said shaft having a circumferential groove formed in it, the improvement comprising a fan for moving air through the machine to ventilate the machine and keep it cool, means for securing the fan to the shaft, said securing means including a hub integrally formed with said fan, said hub having an axial opening in it for receiving said shaft, a plurality of tabs formed in said hub, at least one of said tabs having a projection extending radially inwardly therefrom, said projection snap fitting into said groove to locate said fan on said shaft, and a retention ring fitted over the outer surface of said hub and exerting sufficient compressive force on said at least one of said tabs to retain said at least one of said tabs in said groove when said shaft is rotating during normal motor operation.

2. The improvement of claim 1 wherein the fan has at least two blades.

3. The improvement of claim 2 wherein the hub has a first section and a second section at least partially delimited by said tabs, the first section having a radial thickness greater than the second section said fan involving a plurality of blades integrally formed with said hub along said first section.

4. The improvement of claim 3 wherein the entire hub and the blades are integrally formed with one another.

5. The improvement of claim 4 wherein said fan is constructed from plastic.

6. A dynamoelectric machine comprising:
a housing, said housing including at least one separable end wall, said end wall having an opening in it;
a rotor assembly mounted in said housing including a rotatable shaft, said shaft having a generally uniform shape in silhouette, an outer end of said shaft projecting through the opening in the end wall of said housing, and a locating groove formed in said shaft;
a fan mounted to said shaft, said fan including integral means for mounting said fan to said shaft, said last mentioned means including a hub integrally formed with said fan, said hub having an axial opening through it for receiving said shaft, said hub having an inner end and an outer end, the outer end of said hub including a plurality of tabs, at least one of said tabs having at least one projection extending radially inwardly of the opening in said hub, said projection snap-fitting into the groove of said shaft to mount the fan to said shaft; and,
a retention ring fitted over an outer face of the hub, said retention ring exerting force on said tabs to retain said projection in said groove.

7. A dynamoelectric machine comprising:
a rotor assembly, said rotor assembly including a shaft, said shaft having a generally uniform shape in silhouette, and a locating groove formed in said shaft;
means for rotably supporting said shaft, said supporting means including an endshield having an opening in it sized to permit passage of said shaft;
a fan mounted to said shaft, said fan including means for mounting said fan to said shaft, said last mentioned means including a hub having an axial opening through it for receiving said shaft, said hub having a plurality of tabs formed in it, at least one of said tabs having a projection extending radially inwardly of the axial opening through said hub, said projection snap-fitting into the groove of the shaft to mount the fan to the shaft; and,
a ring mounted to an outer surface of said hub, said ring exerting a radially inward force on said tabs to retain said projection in said groove.

* * * * *